Jan. 12, 1954     E. W. SEEGER     2,666,175
CONTROLLER FOR ELECTRIC MOTORS AND OTHER TRANSLATING DEVICES
Original Filed June 26, 1950
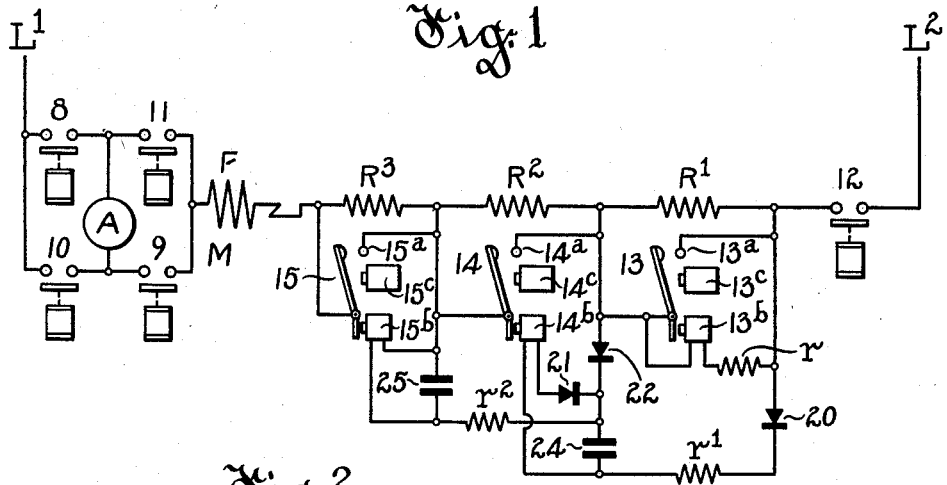
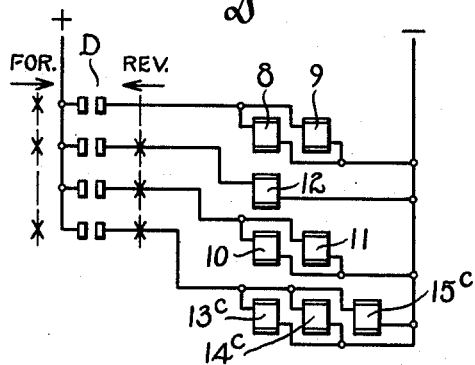
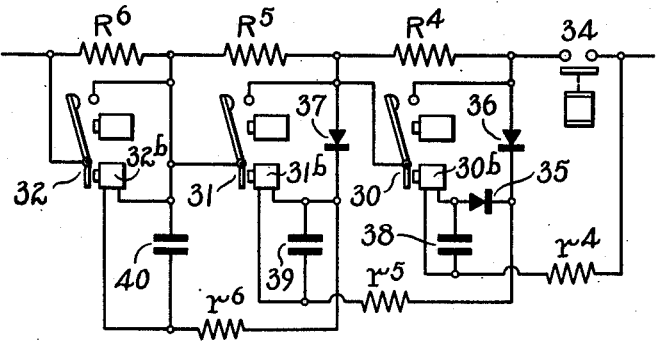
Inventor
Edwin W. Seeger
By Frank Hubbard
Attorney Patented Jan. 12, 1954

2,666,175

UNITED STATES PATENT OFFICE 2,666,175

CONTROLLER FOR ELECTRIC MOTORS AND OTHER TRANSLATING DEVICES

Edwin W. Seeger, Wauwatosa, Wis., assignor to Cutler-Hammer, Inc., Milwaukee, Wis., a corporation of Delaware Continuation of application Serial No. 170,445, June 26, 1950, which is a continuation of application Serial No. 700,148, September 28, 1946. This application June 29, 1953, Serial No. 364,581

12 Claims. (Cl. 318—274)

This invention relates to improvements in controllers for electric motors and other translating devices.

This is a continuation of my application, Serial No. 170,445, filed June 26, 1950, as a continuation of my application Serial No. 700,148, filed September 28, 1946.

In controlling electric motors, as for acceleration, it is commonly desired to render response of a resistance controlling switch dependent upon response of some other switch and then additionally to delay its response for a given transient period, and the present invention has among its objects to provide for such control of one or more electroresponsive switches in an improved way characterized by absence of electrical interlocks commonly employed in accelerating control.

Another object is to provide such improved control which will enable use of capacitance to afford the desired transient period of delay.

Another object is to provide for use of that type of switch having an operating winding and a holding winding to restrain it against response and having its holding winding under capacitance influence to afford the switch its desired time element.

Another object is to obtain through use of simple and inexpensive rectifying means the desired control without need of electrical interlocks.

Various other objects and advantages of the invention will hereinafter appear.

Certain embodiments of the invention are illustrated diagrammatically in the accompanying drawing which will now be described, it being understood that the embodiments illustrated are susceptible of various modifications without departing from the scope of the appended claims.

In the drawing,

Figure 1 shows diagrammatically a motor with accelerating and plugging control means therefor;

Fig. 2 shows diagrammatically control circuits for certain of the switch windings of Fig. 1, and Fig. 3 shows a modification of the control means shown in Fig. 1.

Referring to Fig. 1, the same shows a motor M having an armature A and a series field F. In practice the motor may be of the compound type but for simplicity of illustration it is shown without a shunt field. The motor armature is shown as being reversible under the control of electroresponsive switches 8—9 and 10—11, and as having an electroresponsive main switch 12 which with the reversing switch connects the armature A and series field F across lines $L^1$, $L^2$. The switches 8, 9, 10, 11 and 12 may be controlled in any of the well known ways, as for example in the manner shown in Fig. 2. As will be understood, Fig. 2 shows a master switch D of the drum type having a plurality of pairs of contacts which are disengaged in off position of the drum and which are engaged as indicated by X symbols when the drum is moved to forward and reverse positions selectively.

The motor circuit illustrated includes series resistors $R^1$, $R^2$ and $R^3$ to be excluded from circuit in the order recited, following completion of the motor circuit. The resistor $R^1$ is provided for plugging, and in starting from rest quick exclusion of said resistor is desirable. On the other hand, as is well understood, it is desirable to have the resistor $R^1$ remain in circuit upon plugging pending establishment of certain electrical conditions. To afford resistor $R^1$ the desired control it is shown as provided with conventional short-circuiting means comprising a two coil electroresponsive switch 13. Switch 13 comprises a double ended armature lever biased to stand in the position illustrated out of engagement with contact $13^a$. A holding or restraining winding $13^b$ is provided to temporarily restrain the switch in this position while an operating winding $13^c$ is provided to effect closure of the switch when released by the winding $13^b$. The winding $13^b$ is connected across the resistor $R^1$ preferably through a suitable resistor $r$, while the winding $13^c$ as shown in Fig. 2 is preferably of the shunt type to be energized upon completion of the motor circuit and to be momentarily deenergized in reversing the motor for plugging.

The resistors $R^2$ and $R^3$ are for acceleration and are respectively under the control of switches 14 and 15 of the same type as the heretofore described switch 13. Their operating windings $14^c$ and $15^c$, respectively, are shown in Fig. 2 as being controllable in the same way as the corresponding winding of switch 13. The switches 14 and 15 when closed respectively short-circuit resistors $R^2$ and $R^3$, as will be apparent. The holding windings $14^b$ and $15^b$ of switches 14 and 15 respectively have distinctive circuit connections now to be described.

The holding windings $14^b$ and $15^b$ are connected in series across the series connected resistors $R^1$ and $R^2$. The connection for these windings may be traced from the right hand terminal of resistor $R^1$ through a rectifier 20 and resistor $r^1$, to and through winding 14$^b$ and thence through a rectifier 21 and resistor $r^2$ to and through winding 15$^b$ to the left hand terminal of resistor $R^2$. There is also a connection from a point between resistors $R^1$ and $R^2$ to a point between windings 14$^b$ and 15$^b$, this connection including a rectifier 22 through which current passes to winding 15$^b$ only, the rectifiers 22 and 21 being in an opposed relation in the connection between winding 14$^b$ and the common point of resistors $R^1$ and $R^2$. As will be understood, the rectifiers 20, 21 and 22 each pass current in one direction only, or at least prevent any substantial flow of current in the reverse direction. Additionally the connections for windings 14$^b$ and 15$^b$ include a capacitor 24 in parallel with the winding 14$^b$ and a capacitor 25 in parallel with the winding 15$^b$.

With such connections when the motor circuit is closed and switch 13 is open all resistors $R^1$ to $R^3$ are in circuit and the windings 14$^b$ and 15$^b$ are energized as a function of the potential drop across resistors $R^1$ and $R^2$. Also the capacitors 24 and 25 are charged as a function of such potential drop. Then when switch 13 closes, winding 14$^b$ of switch 14 becomes shunted through a circuit extending from the right hand terminal of resistor $R^1$ through switch 13 and rectifier 22 to winding 15$^b$. Thus closure of switch 13 tends to deenergize winding 14$^b$, while leaving winding 15$^b$ of switch 15 across resistor $R^2$ for continued energization. However, when winding 14$^b$ is thus short-circuited the capacitor 24 is caused to discharge through said winding to delay its deenergization for a transient period. Moreover the discharge of capacitor 24 is confined to its path through winding 14$^b$, being prevented by rectifier 20 from taking any other path. When the capacitor 24 ceases to be effective the winding 14$^b$ releases switch 14 for response under the influence of winding 14$^c$, but the period of effectiveness of the capacitor is adequate to afford a substantial time delay in response of switch 14 following response of switch 13.

When switch 14 responds it short-circuits resistor $R^2$ and thereby tends to deenergize winding 15$^b$ of switch 15, but it also effects discharge of capacitor 25. Capacitor 25 discharges through winding 15$^b$ to delay its deenergization, and discharge of said capacitor is limited to the path through said winding, being prevented by the rectifiers from taking any other path. When capacitor 25 ceases to be effective the winding 15$^b$ releases switch 15 for operation in response to winding 15$^c$, thereby to short-circuit resistor $R^3$. However, response of the switch 15 is delayed for a substantial period following response of switch 14.

As will be apparent, the aforedescribed connections, inclusive of the rectifiers, avoid need of special electrical interlocks and it has been found that simple and inexpensive rectifiers will give the desired results with reliability. Also as will be apparent, it is possible to apply this control to a lesser or greater number of switches. Here also it should be noted that while it has been found advantageous to employ resistors $r^1$ and $r^2$, use thereof is optional, and that if desired the capacitors may be connected in parallel with less than the total number of turns of their respective windings.

With the circuits shown in Fig. 1 it will be noted that the rectifiers are external of the connections between the winding 13$^b$ of switch 13 and resistor $R^1$ and that the special connections for the windings 14$^b$ and 15$^b$ in nowise interfere with the usual well known operation of switch 13 in starting from rest or upon reversals for plugging.

Referring to the modifications shown in Fig. 3, three resistors $R^4$, $R^5$ and $R^6$ are controlled respectively by switches 30, 31, 32, which switches are of the same type as the corresponding switches of Fig. 1. Also Fig. 3 shows a main switch 34 like switch 12 of Fig. 1. The operating windings of these switches are assumed to be controlled in the same manner as the corresponding windings of Fig. 1.

The holding or restraining windings of switches 30, 31 and 32 are interconnected in a series relation across the gap in the motor circuit controlled by switch 34, to a point between resistors $R^5$ and $R^6$. More specifically, the circuit extends from the right hand side of switch 34 through resistor $r^4$, winding 30$^b$, rectifier 35, resistor $r^5$, winding 31$^b$, resistor $r^6$, winding 32$^b$ to the left hand terminal of resistor $R^5$. Also there is a connection from the right hand terminal of resistor $R^4$ through a rectifier 36 to a point between the opposed rectifier 35 and resistor $r^5$ and a further connection from the common point of resistors $R^4$ and $R^5$ through a rectifier 37 to a point between winding 31$^b$ and resistor $r^6$, which connections render winding 31$^b$ responsive to the potential drop across resistor $R^4$ and winding 32$^b$ responsive to the potential drop across resistor $R^5$. Capacitors 38, 39 and 40 parallel windings 30$^b$, 31$^b$ and 32$^b$.

Thus with the connections shown in Fig. 3 the windings 30$^b$, 31$^b$ and 32$^b$ will be energized in advance of response of the main switch 34, assuming line connection of the leads to resistor $R^6$ and to the right hand side of switch 34. Also the capacitors will become charged and when switch 34 closes it will tend to deenergize winding 30$^b$, but deenergization of said winding will be delayed by capacitor 38. More specifically, closure of switch 34 results in short-circuiting winding 30$^b$ through the connection including rectifier 36, which connection maintains circuit through windings 31$^b$ and 32$^b$ in series. Here it will be noted that rectifier 35 confines the discharge of capacitor 38 to the path including its respective winding.

When switch 30 responds it short-circuits resistor $R^4$ and the winding 31$^b$, but deenergization of said winding is delayed by discharge of capacitor 39, the rectifiers confining the discharge of said capacitor to the path including said winding. Meanwhile the connection including rectifier 37 preserves for winding 32$^b$ a circuit across resistor $R^5$ for continued energization of said winding.

When switch 31 responds it short-circuits resistor $R^5$ and hence deenergizes winding 32$^b$ subject to delay by discharge of capacitor 40, the rectifiers serving to confine discharge of said capacitor to the path including said winding. Thus switch 32 is rendered responsive, subject to its time element, to short-circuit resistor $R^6$.

Thus assuming the circuit of Fig. 3 to be a motor circuit and all three resistors to be employed for acceleration, it will be observed that provision is made for three steps of acceleration with a delay in response of each accelerating switch, inclusive of the first, as a function of discharge of the respective capacitor of each.

What I claim as new and desire to secure by Letters Patent is:

1. In combination, a translating circuit, a switch to control said circuit after energization of the latter, said switch having operating means and a winding energized by current derived from said circuit, which winding when energized affords restraint against operation of said switch, means to consummate supply of current to said translating circuit while said switch is restrained by said winding and to provide for shunting said winding subsequent to energization thereof, a capacitor in parallel with said winding for charging when said winding is energized and for discharging when said winding is shunted, and rectifying means confining discharge of said capacitor to a path including said winding.

2. In combination, a translating circuit, a switch to control said circuit after energization of the latter, said switch having an operating winding with control means therefor and also having a second winding supplied with current derived from said circuit to restrain said switch against response to the first mentioned winding, means to consummate supply of current to said translating circuit while said switch is restrained by said second winding and to provide for shunting said second winding subsequent to energization thereof, a capacitor in parallel with said second winding for charging when said second winding is energized and for discharging when said second winding is shunted, and rectifying means confining discharge of said capacitor to a path including said second winding.

3. In combination, a translating circuit including resistance, a resistance controlling switch for said circuit having operating means and a winding energized as a function of potential drop afforded by such resistance, said winding when energized affording restraint against operation of said switch, means to consummate supply of said circuit with current while said switch is restrained by said winding and to provide for shunting said winding subsequent to energization thereof, a capacitor in parallel with said winding for charging when said winding is energized and for discharging when said winding is shunted, and rectifying means confining discharge of said capacitor to a path including said winding.

4. In combination, a translating circuit having means to effect its energization, a first control switch for said circuit, a second control switch for said circuit having operating means and a winding which upon energization of said circuit is energized by current derived from said circuit and when so energized effecting restraint of said second switch against operation, said first switch being operable while said second switch is so restrained, and said first switch when operated effecting shunting of said winding of said second switch, a capacitor in parallel with said winding for charging when said winding is energized and for discharging when said winding is shunted, and rectifying means confining discharge of said capacitor to a path including said winding.

5. In combination, a translating circuit having means to effect its energization, a first control switch therefor, a second control switch for said circuit, said switches having operating windings to be energized at the same time, and said second switch having a restraining winding which upon energization of said circuit is energized by current derived from said circuit and when so energized effecting restraint of said second switch against response while said first switch responds, said first switch upon responding effecting shunting of said restraining winding, a capacitor in parallel with said restraining winding, and rectifying means confining discharge of said capacitor to a path including said restraining winding.

6. In combination, a translating circuit having means to effect its energization, a plurality of control switches for said circuit having operating windings to be energized at the same time, each of at least two of said switches having a restraining winding which upon energization of said circuit is energized by current derived from said circuit and when so energized affording restraint against response of its respective switch, a shunt circuit for each of said restraining windings controlled by one of said switches other than its respective switch whereby sequential operation of said switches is obtained, capacitors in parallel with said restraining windings and individualized thereto, and rectifying means confining discharge of each capacitor to a path including its respective restraining winding.

7. In combination, a translating circuit including a sectional resistor, control switches for shunting sections of said resistor individualized thereto, said switches having operating windings to be energized at the same time, and each of a plurality of said switches having a restraining winding in parallel with a portion of said resistor, said restraining windings effecting restraint of their respective switches against response pending response of other of said switches, capacitors in parallel with said restraining windings and individualized thereto, and rectifying means confining discharge of each of said capacitors to a path through its respective restraining windings.

8. In combination, a translating circuit, a resistor included therein, a control switch for said circuit having operating means and a winding connected in parallel with said resistor for energization to restrain said switch against operation, a capacitor in parallel with said winding, means operable subsequent to energization of said winding to short-circuit said resistor thereby tending to deenergize said winding, and a rectifier in circuit with said winding permitting current flow thereto and to said capacitor from said translating circuit and permitting current flow to said winding from said capacitor while blocking discharge from said capacitor to paths other than that including said winding.

9. In combination, a translating circuit having means to effect its energization, a first control switch and a second control switch for said circuit, individual restraining windings for said switches, connections between said circuit and said windings alternatively to energize said windings in series relation by current derived from said circuit upon energization of the latter or to shunt one while energizing the other, capacitors connected in parallel with said windings individually and two rectifiers so disposed in said connections as to permit charge of said capacitors when their respective restraining windings are energized and to permit discharge of said capacitors to their respective windings but to block discharge from either capacitor to paths other than the path including its respective winding.

10. In combination, a motor, means to establish a power circuit therefor and to effect reversals of flow of current through an element of said motor for plugging, a series resistor for plugging, an accelerating switch having an operating winding with control means therefor and a second winding to restrain it against response to said operating winding, a capacitor, said capacitor and said second winding being connected in parallel with one another and with a given amount of said plugging resistor for energization of said winding and charge of said condenser by motor current means operable subsequent to energization of said second winding to short-circuit said resistor thereby tending to deenergize said second winding and to cause discharge of said capacitor, and rectifying means confining the discharge of said capacitor to a path including said second winding.

11. In combination, a motor, a switch to connect said motor to a power supply, an accelerating switch having an operating winding with control means therefor and a second winding to restrain it against response to said operating winding, a capacitor, said second winding and said capacitor being connected in parallel with one another across the gap in the motor circuit controlled by the first mentioned switch, thus to be shunted upon closure of the first mentioned switch, and rectifying means confining the discharge of said capacitor to the path including said second winding.

12. In combination, a motor, resistors, a switch to connect said motor and resistors in series to a power supply, switches individual to said resistors for separately short-circuiting the same, each of said resistor controlling switches having operating means and a winding energizable to restrain the same against operation, a series circuit for said windings in shunt to a portion of the motor circuit including the first mentioned switch and at least part of said resistors, connections including a connection between such portion of the motor circuit and a common point of two of said windings whereby one of said two windings is shunted from said series circuit of said windings when the first mentioned switch is closed, and whereby the other remains in circuit in shunt to certain of said resistors but subject to electrical isolation thereof by response of the resistor controlling switch first relieved of restraint, capacitors connected in parallel with said two windings individually, and rectifying means in said connections confining the discharge of each of said capacitors to a path including its respective winding.

EDWIN W. SEEGER.

References Cited in the file of this patent

UNITED STATES PATENTS

| Number | Name | Date |
|---|---|---|
| 1,727,872 | Evans | Sept. 10, 1929 |
| 2,233,169 | Jones | Feb. 25, 1941 |
| 2,339,125 | Winter | Jan. 11, 1944 |